US011982292B2

(12) United States Patent
Iwakiri

(10) Patent No.: US 11,982,292 B2
(45) Date of Patent: May 14, 2024

(54) SCROLL CASING AND CENTRIFUGAL COMPRESSOR

(71) Applicant: MITSUBISHI HEAVY INDUSTRIES ENGINE & TURBOCHARGER, LTD., Sagamihara (JP)

(72) Inventor: Kenichiro Iwakiri, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 17/922,299

(22) PCT Filed: May 21, 2020

(86) PCT No.: PCT/JP2020/020032
§ 371 (c)(1),
(2) Date: Oct. 28, 2022

(87) PCT Pub. No.: WO2021/234884
PCT Pub. Date: Nov. 25, 2021

(65) Prior Publication Data
US 2023/0175525 A1 Jun. 8, 2023

(51) Int. Cl.
*F04D 29/44* (2006.01)
*F04D 17/10* (2006.01)
*F04D 29/42* (2006.01)

(52) U.S. Cl.
CPC ........... *F04D 29/441* (2013.01); *F04D 17/10* (2013.01); *F04D 29/4206* (2013.01); *F05D 2220/40* (2013.01)

(58) Field of Classification Search
None
See application file for complete search history.

(56) References Cited

U.S. PATENT DOCUMENTS

2013/0272865 A1* 10/2013 Hoshi ..................... F01D 25/24 415/204
2018/0347382 A1* 12/2018 Iwakiri ................... F01D 9/026
2020/0217329 A1 7/2020 Iwakiri

FOREIGN PATENT DOCUMENTS

JP 2017-89571 A 5/2017
WO WO 2012/090853 A1 7/2012
(Continued)

OTHER PUBLICATIONS

International Preliminary Report on Patentability and Written Opinion of the International Searching Authority for International Application No. PCT/JP2020/020032, dated Dec. 1, 2022, with an English translation.
(Continued)

*Primary Examiner* — Juan G Flores
(74) *Attorney, Agent, or Firm* — Birch, Stewart, Kolasch & Birch, LLP

(57) ABSTRACT

A scroll casing for a centrifugal compressor satisfies a relationship of Tb/Ta≥1.0 in a range of an angular position around a scroll center of the scroll passage from 180 degrees to 360 degrees, where Ta is a passage width of the diffuser passage along an axial direction of the centrifugal compressor, Tb is a shortest distance from a start position which is a connection position with a hub-side passage surface of the diffuser passage on an inner peripheral surface of a scroll portion forming the scroll passage to a virtual arc that touches an end position which is a position opposite to the start position on the inner peripheral surface, and the angular position is defined so that the angle gradually increases from a merging position between a scroll start and a scroll end of the scroll passage of 60 degrees to the downstream side of the scroll passage.

8 Claims, 15 Drawing Sheets

(56) References Cited

FOREIGN PATENT DOCUMENTS

| | | | |
|---|---|---|---|
| WO | WO 2017/109949 | A1 | 6/2017 |
| WO | WO 2018/179112 | A1 | 10/2018 |

OTHER PUBLICATIONS

International Search Report and Written Opinion of the International Searching Authority for International Application No. PCT/JP2020/020032, dated Jul. 21, 2020.

* cited by examiner

SCROLL CASING AND CENTRIFUGAL COMPRESSOR

TECHNICAL FIELD

The present disclosure relates to a scroll casing and a centrifugal compressor including the scroll casing.

BACKGROUND

A centrifugal compressor used in a compressor part or the like of a turbocharger for an automobile or a ship imparts kinetic energy to a fluid through rotation of an impeller and discharges the fluid outward in the radial direction, thereby achieving a pressure increase of the fluid by utilizing the centrifugal force. Such a centrifugal compressor is provided with various features to meet the need to improve the pressure ratio and the efficiency in a broad operational range.

Generally, a centrifugal compressor includes an impeller and a scroll casing rotatably housing the impeller. This scroll casing includes a scroll portion forming a spiral scroll passage, and a diffuser portion forming a diffuser passage for introducing a fluid having passed through the impeller to the scroll passage (for example, Patent Document 1).

CITATION LIST

Patent Literature

Patent Document 1: WO2018/179112A

SUMMARY

Problems to be Solved

FIGS. 14 and 15 are each an explanatory diagram for describing the shape of a diffuser portion 04 and a scroll portion 05 of a scroll casing 03 of a centrifugal compressor according to a comparative example. As shown in FIGS. 14 and 15, the scroll portion 05 has an inner peripheral surface 051 defining a scroll passage 050. The inner peripheral surface 051 is formed in an arc shape extending from a start position P01 which is a connection position with a hub-side passage surface 042 of a diffuser passage 040 toward a one-direction UD side to an end position P02 which is a position opposite to the start position P01. The scroll casing 03 has a diffuser outlet jaw portion 054 including the inner peripheral surface 051 including the end position P02 and a shroud-side passage surface 041 of the diffuser passage 040. A fluid flowing from the outlet of the diffuser passage 040 into the scroll passage 050 has a swirl velocity component, which forms a swirling flow SF flowing toward the one-direction UD side along the inner peripheral surface 051. In such a scroll passage 050, the swirling flow SF flowing along the inner peripheral surface 051 merges with the outlet flow DF of the diffuser passage flowing from the outlet of the diffuser passage 040 into the scroll passage 050 downstream of the diffuser outlet jaw portion 054.

According to the inventors' knowledge, as shown in FIG. 14, when the thickness T of the diffuser outlet jaw portion 054, i.e., the length T along the axial direction between the downstream end 043 of the shroud-side passage surface 041 of the diffuser passage 040 and the end position P02, is large, a low flow velocity region WA, called a wake, may occur at a position immediately downstream of the diffuser outlet jaw portion 054 according to the thickness T of the diffuser outlet jaw portion 054. When the wake is large, wake loss of the swirling flow SF increases, which may lead to a reduction in the efficiency of the centrifugal compressor.

If the thickness T of the diffuser outlet jaw portion 054 is decreased as shown in FIG. 15 in order to suppress the wake loss, the difference in flow angle between the swirling flow SF and the outlet flow DF of the diffuser passage 040 increases, so that at least part of the outlet flow DF is blocked by the interference between the swirling flow SF and the outlet flow DF. When at least part of the outlet flow DF is blocked, the resistance of the fluid passing through the diffuser passage 040 increases, which may induce diffuser stall. When the diffuser stall is induced, the efficiency of the centrifugal compressor is extremely reduced, and surge is induced due to the diffuser stall, resulting in a reduction in the operating range of the centrifugal compressor. Further, if the thickness T of the diffuser outlet jaw portion 054 is too small, the diffuser outlet jaw portion 054 may chip undesirably.

In view of the above, an object of at least one embodiment of the present disclosure is to provide a scroll casing and a centrifugal compressor whereby it is possible to suppress the reduction in the efficiency of the centrifugal compressor and the reduction in the operating range.

Solution to the Problems

A scroll casing according to the present disclosure is a scroll casing for a centrifugal compressor, including: a diffuser portion forming a diffuser passage of the centrifugal compressor; and a scroll portion forming a scroll passage of the centrifugal compressor, in which a relationship of $Tb/Ta \geq 1.0$ is satisfied in a range of an angular position around a scroll center of the scroll passage from 180 degrees to 360 degrees, where Ta is a passage width of the diffuser passage along an axial direction of the centrifugal compressor, Tb is a shortest distance from a start position which is a connection position with a hub-side passage surface of the diffuser passage on an inner peripheral surface of the scroll portion to a virtual arc that touches an end position which is a position opposite to the start position on the inner peripheral surface, and the angular position is defined so that the angle gradually increases from a merging position between a scroll start and a scroll end of the scroll passage of 60 degrees to a downstream side of the scroll passage.

A centrifugal compressor according to the present disclosure includes the above-described scroll casing.

Advantageous Effects

At least one embodiment of the present disclosure provides a scroll casing and a centrifugal compressor whereby it is possible to suppress the reduction in the efficiency of the centrifugal compressor and the reduction in the operating range.

DETAILED DESCRIPTION

Figure 1:
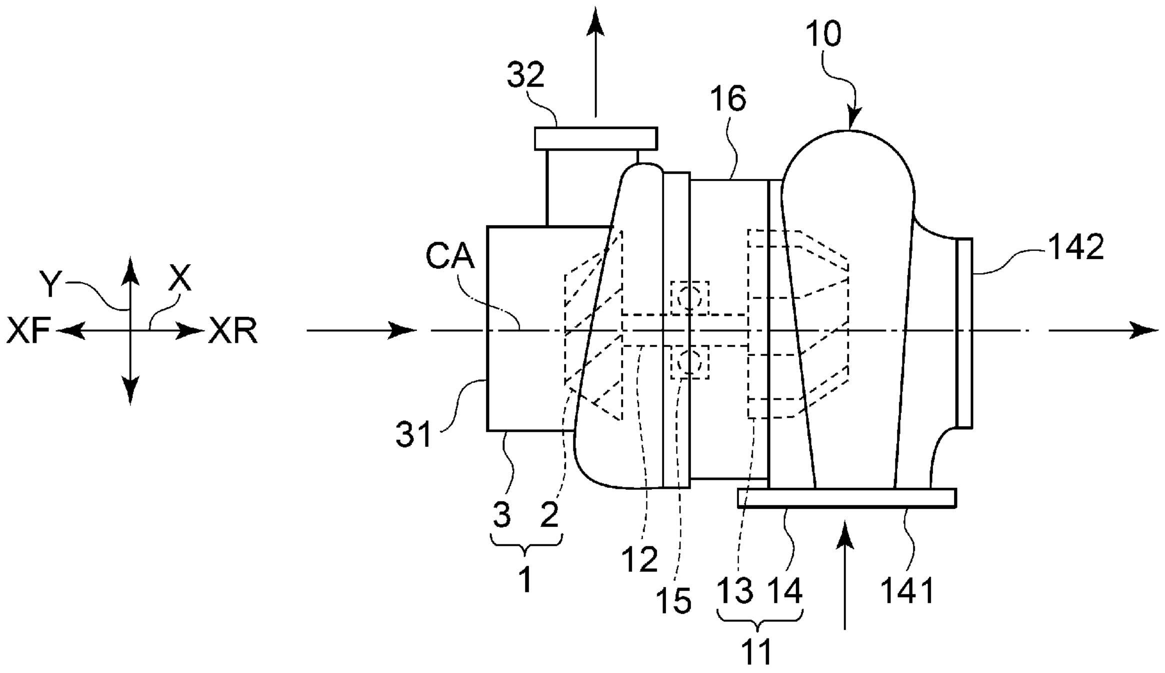
FIG. 1 is an explanatory diagram for describing the configuration of a turbocharger equipped with a centrifugal compressor according to an embodiment.

Embodiments of the present disclosure will be described below with reference to the accompanying drawings. It is intended, however, that unless particularly identified, dimensions, materials, shapes, relative positions, and the like of components described in the embodiments shall be interpreted as illustrative only and not intended to limit the scope of the present disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

The same features can be indicated by the same reference numerals and not described in detail.

(Centrifugal Compressor and Turbocharger)

Figure 2:
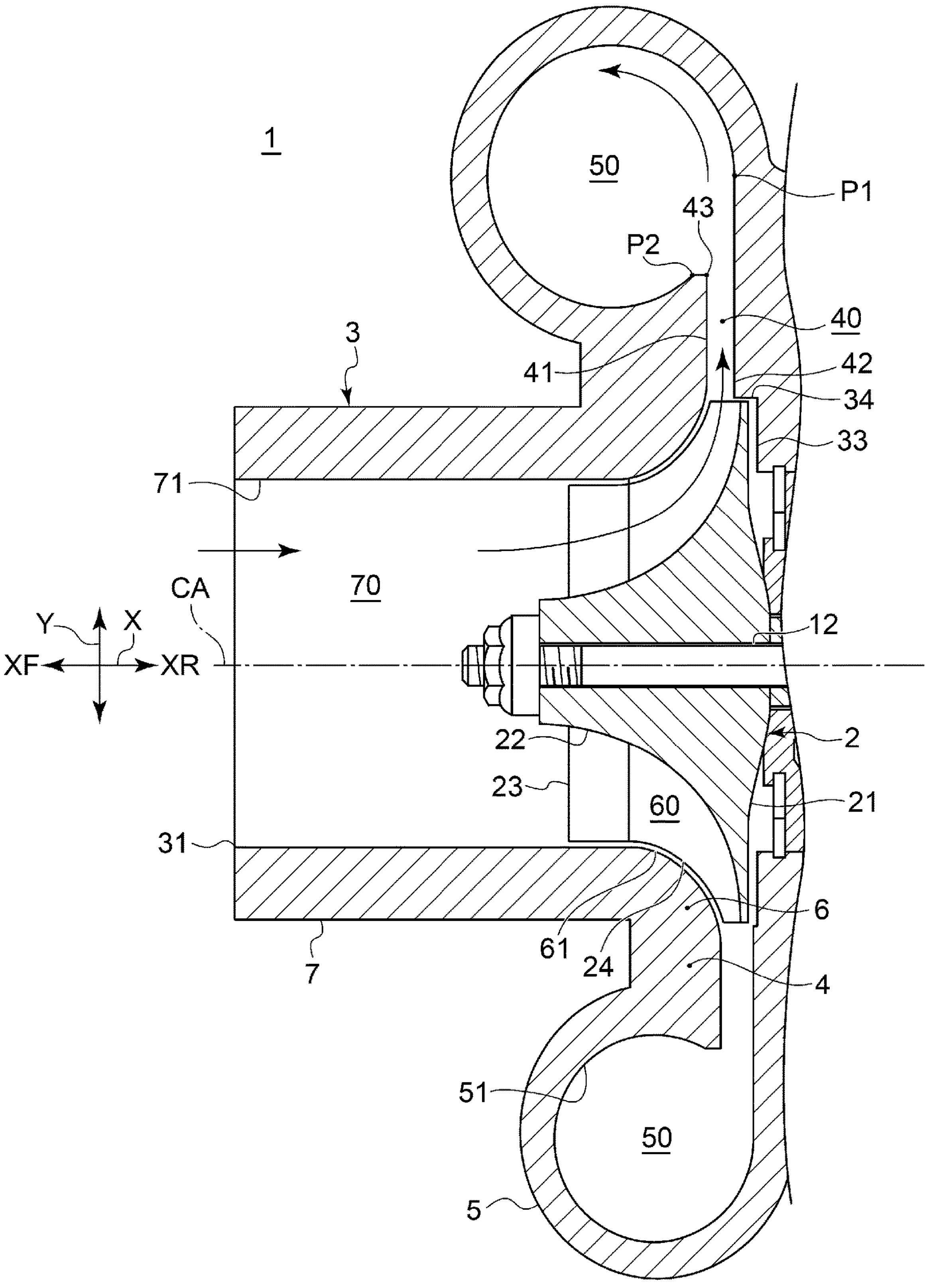
FIG. 2 is a schematic cross-sectional view schematically showing a compressor side of the turbocharger equipped with the centrifugal compressor according to an embodiment, in a cross-section including the axis of the centrifugal compressor.

FIG. 1 is an explanatory diagram for describing the configuration of a turbocharger equipped with a centrifugal compressor according to an embodiment. FIG. 2 is a schematic cross-sectional view of a compressor side of the turbocharger equipped with the centrifugal compressor according to an embodiment, in a cross-section including the axis of the centrifugal compressor.

As shown in FIGS. 1 and 2, a centrifugal compressor 1 according to some embodiments of the present disclosure includes an impeller 2 and a scroll casing 3 configured to rotatably house the impeller 2. As shown in FIG. 2, the scroll casing 3 includes at least a diffuser portion 4 forming a diffuser passage 40 of the centrifugal compressor 1 and a scroll portion 5 forming a scroll passage 50 of the centrifugal compressor 1. The diffuser passage 40 is a flow passage for guiding a fluid having passed through the impeller 2 to the spiral scroll passage 50 disposed around the impeller 2.

The centrifugal compressor 1 can be applied to, for example, turbochargers 10 for automobiles, ships, or power generation, or other industrial centrifugal compressors, blowers, or the like. In the illustrated embodiment, the centrifugal compressor 1 is mounted in a turbocharger 10. As shown in FIG. 1, the turbocharger 10 includes the centrifugal compressor 1, a turbine 11, and a rotational shaft 12. The turbine 11 includes a turbine rotor 13 mechanically connected to the impeller 2 via the rotational shaft 12, and a turbine casing 14 rotatably housing the turbine rotor 13.

In the illustrated embodiment, as shown in FIG. 1, the turbocharger 10 further includes a bearing 15 rotatably supporting the rotational shaft 12 and a bearing casing 16 configured to house the bearing 15. The bearing casing 16 is arranged between the scroll casing 3 and the turbine casing 14, and is mechanically connected to the scroll casing 3 and the turbine casing 14 by fastening members such as fastening bolts.

Hereinafter, for example as shown in FIG. 1, the extension direction of the axis CA of the centrifugal compressor 1, i.e., the axis of the impeller 2 will be referred to as the axial direction X, and the direction perpendicular to the axis CA is referred to as the radial direction Y. In the axial direction X, the upstream side with respect to the intake direction of the centrifugal compressor 1, i.e., the side where a fluid introduction port 31 is positioned with respect to the impeller 2 (left side in the figure) will be referred to as the front side XF. Further, in the axial direction X, the downstream side with respect to the intake direction of the centrifugal compressor 1, i.e., the side where the impeller 2 is positioned with respect to the fluid introduction port 31 (right side in the figure) will be referred to as the rear side XR.

In the illustrated embodiment, as shown in FIG. 1, the scroll casing 3 has a fluid introduction port 31 for introducing a fluid (e.g., air) from the outside of the scroll casing 3, and a fluid discharge port 32 for discharging the fluid that has passed through the impeller 2 and the scroll passage 50 to the outside of the scroll casing 3. The turbine casing 14 has an exhaust gas introduction port 141 for introducing an exhaust gas into the turbine casing 14, and an exhaust gas discharge port 142 for discharging the exhaust gas that has passed through the turbine rotor 13 to the outside of the turbine casing 14.

As shown in FIG. 1, the rotational shaft 12 has a longitudinal direction along the axial direction X. The rotational shaft 12 is mechanically connected at one end (front side XF) in the longitudinal direction to the impeller 2, and is mechanically connected at the other end (rear side XR) in the longitudinal direction to the turbine rotor 13. The expression "along a certain direction" in the present disclosure includes not only the certain direction but also a direction inclined with respect to the certain direction.

The turbocharger 10 rotates the turbine rotor 13 by the exhaust gas introduced from an exhaust gas generation device (not shown, e.g., internal combustion engine such as engine) into the turbine casing 14 through the exhaust gas introduction port 141. Since the impeller 2 is mechanically connected to the turbine rotor 13 via the rotational shaft 12, the impeller 2 rotates in conjunction with the rotation of the turbine rotor 13. By rotating the impeller 2, the turbocharger 10 compresses the fluid introduced into the scroll casing 3 through the fluid introduction port 31 and sends it to a supply destination (e.g., internal combustion engine such as engine) through the fluid discharge port 32.

(Impeller)

As shown in FIG. 2, the impeller 2 includes a hub 21 and a plurality of impeller blades 23 disposed on an outer surface 22 of the hub 21. Since the hub 21 is mechanically fixed to one side of the rotational shaft 12, the hub 21 and the plurality of impeller blades 23 can rotate in conjunction with the rotational shaft 12 about the axis CA of the impeller 2. The impeller 2 is configured to guide the fluid introduced from the front side XF in the axial direction X to the outer side in the radial direction Y. In the illustrated embodiment, the impeller blades 23 are arranged at intervals in the circumferential direction about the axis CA. A gap (clearance) is formed between the tip 24 of each of the plurality of impeller blades 23 and a shroud surface 61 curved convexly so as to face the tip 24.

(Scroll Casing)

In the illustrated embodiment, as shown in FIG. 2, the scroll casing 3 includes an intake passage portion 7 which forms an intake passage 70 for introducing a fluid from the outside of the scroll casing 3 to the impeller 2, a shroud portion 6 having a shroud surface 61, and the above-described scroll portion 5 which forms the scroll passage 50 for introducing the fluid having passed through the impeller 2 to the outside of the scroll casing 3.

Each of the intake passage 70, the diffuser passage 40, and the scroll passage 50 is formed in the scroll casing 3. The scroll passage 50 is disposed outward of the impeller 2 in the radial direction. The intake passage portion 7 has an inner wall surface 71 forming the intake passage 70 and extending along the axial direction X. The fluid introduction port 31 is formed at the front side XF end of the inner wall surface 71. The scroll portion 5 has an inner peripheral surface 51 forming the scroll passage 50.

The diffuser portion 4 has a shroud-side passage surface 41 forming a front side XF section of the diffuser passage 40, and a hub-side passage surface 42 disposed on the rear side XR of the shroud-side passage surface 41 so as to face the shroud-side passage surface 41 and forming a rear side XR section of the diffuser passage 40. In a cross-section along the axis CA as shown in FIG. 2, the shroud-side passage surface 41 and the hub-side passage surface 42 extend along a direction intersecting (in the illustrated example, perpendicular to) the axis CA.

The diffuser portion 4 is disposed between the shroud portion 6 and the scroll portion 5. In the illustrated embodiment, the scroll casing 3 internally forms an impeller chamber 60 housing the impeller 2. The shroud surface 61 forms a front side XF section of the impeller chamber 60. The scroll casing 3 has an impeller chamber forming surface 33 disposed on the rear side XR of the shroud surface 61 and forming a rear side XR section of the impeller chamber 60.

The inlet of the diffuser passage 40 communicates with the impeller chamber 60, and the outlet of the diffuser passage 40 communicates with the scroll passage 50. In the illustrated embodiment, the upstream end of the shroud-side passage surface 41 is smoothly connected to the downstream end of the shroud surface 61. The upstream end of the hub-side passage surface 42 is connected to the outer peripheral end of the impeller chamber forming surface 33 via a stepped surface 34, and the downstream end of the hub-side passage surface 42 is smoothly connected to one end of the inner peripheral surface 51 of the scroll portion 5.

The fluid introduced into the scroll casing 3 through the fluid introduction port 31 flows through the intake passage 70 to the rear side XR and then is sent to the impeller 2 (impeller chamber 60). The fluid having passed through the impeller 2 flows through the diffuser passage 40 and the scroll passage 50 in this order, and then is discharged to the outside of the scroll casing 3 through the fluid discharge port 32.

(Distance Ratio Tb/Ta)

Figure 3:
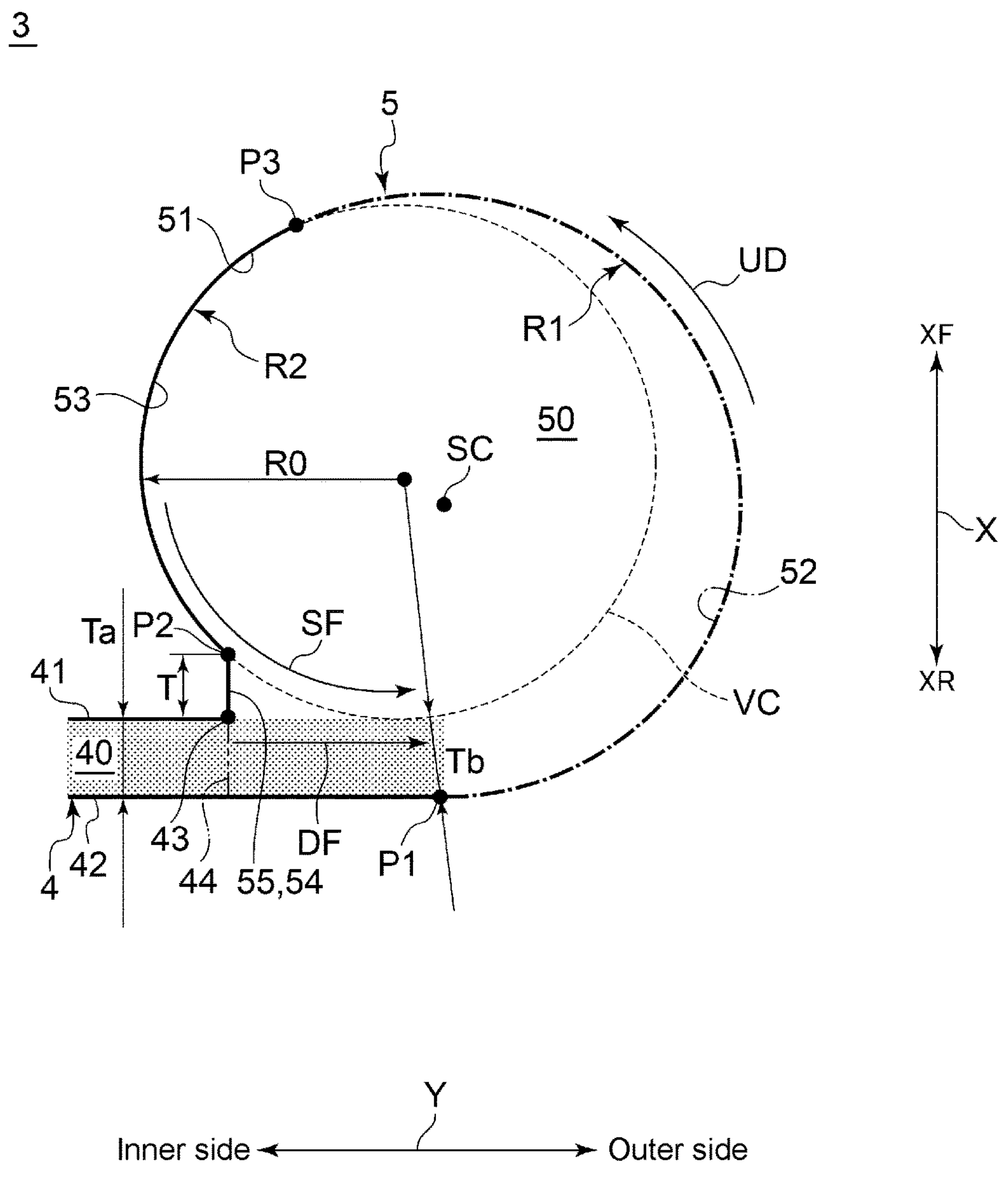
FIG. 3 is an explanatory diagram for describing the shape of the diffuser portion and the scroll portion of the scroll casing according to an embodiment.
Figure 4:
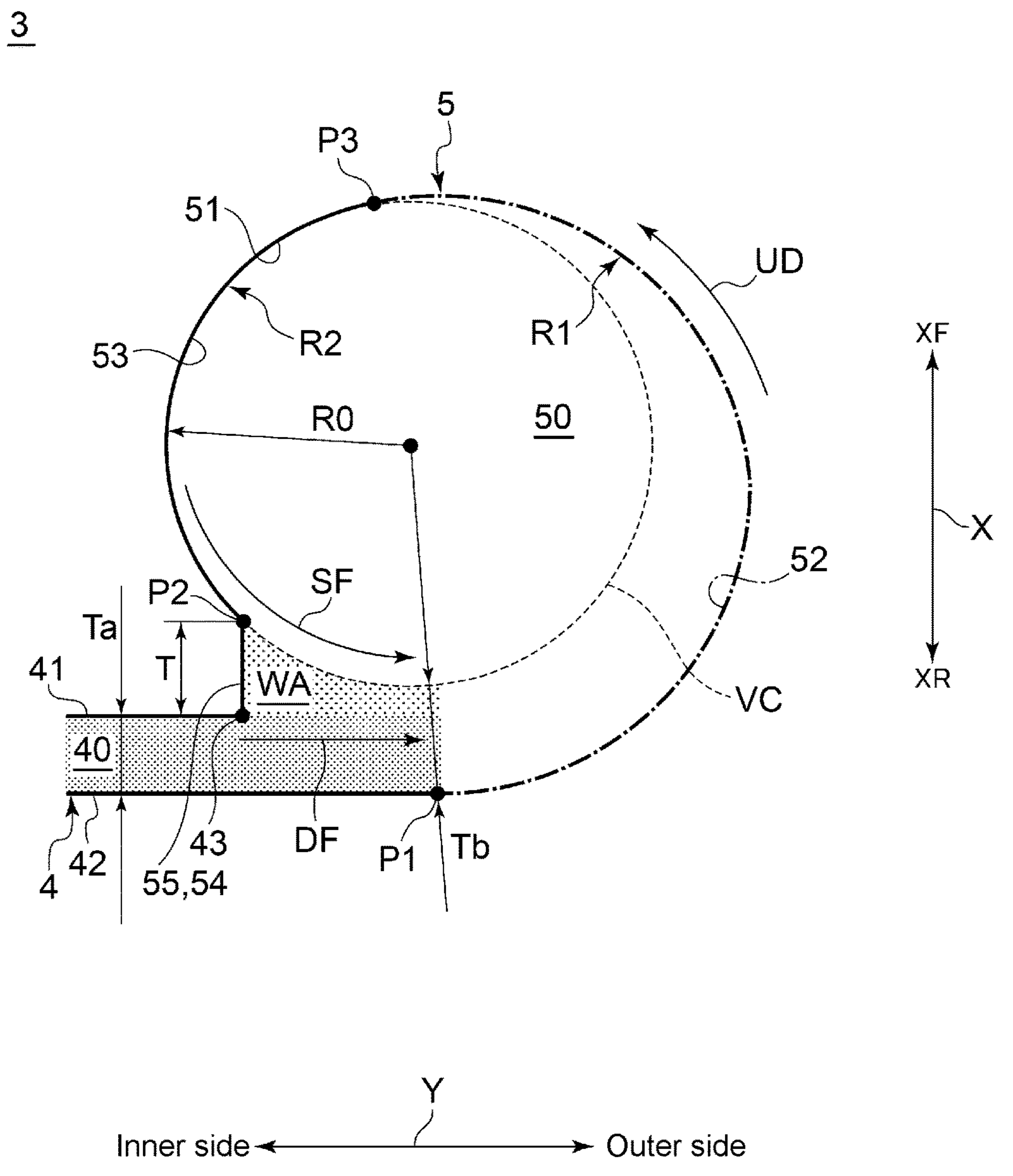
FIG. 4 is an explanatory diagram for describing the shape of the diffuser portion and the scroll portion of the scroll casing according to an embodiment.
Figure 5:
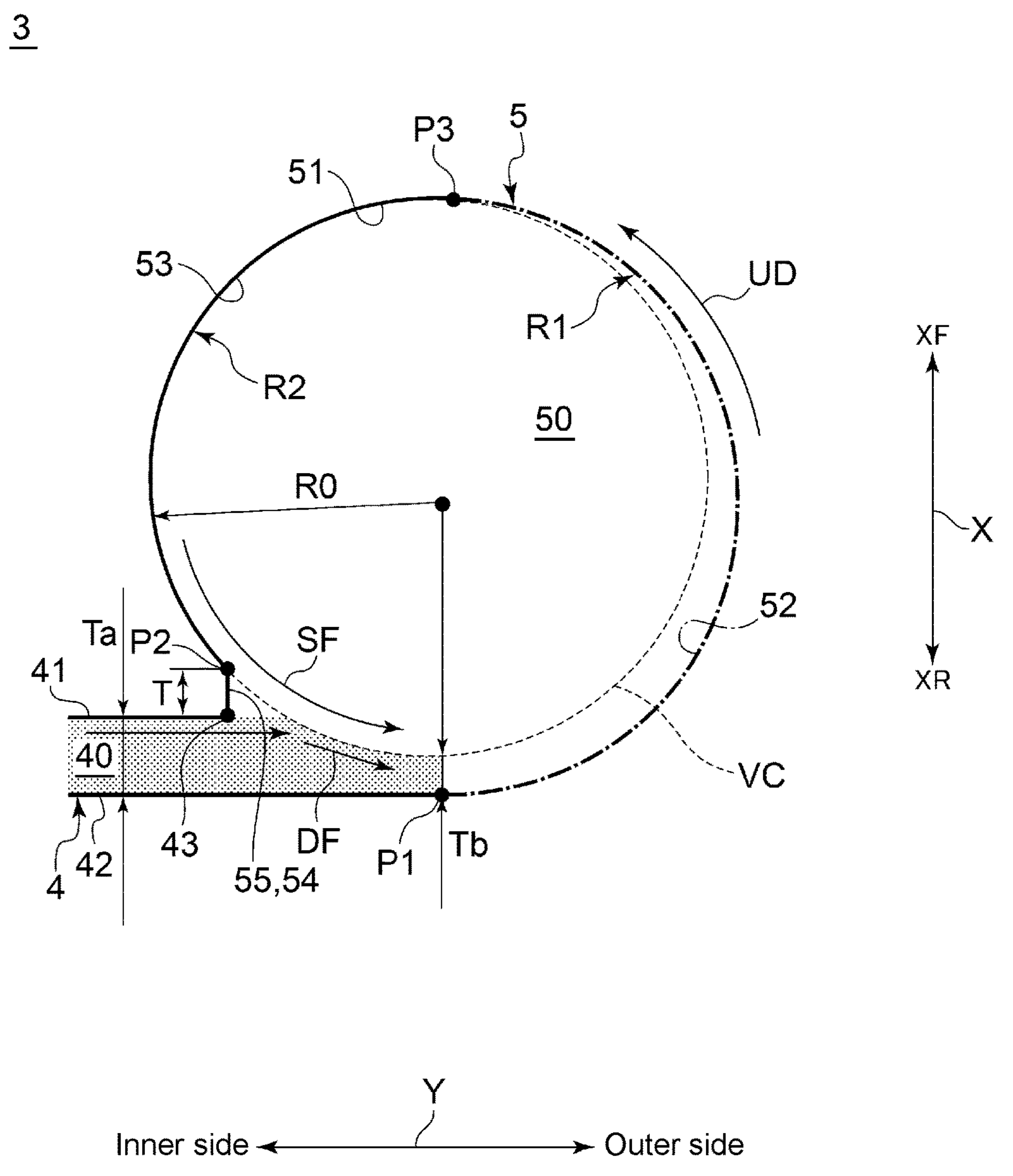
FIG. 5 is an explanatory diagram for describing the shape of the diffuser portion and the scroll portion of the scroll casing according to an embodiment.
Figure 6:
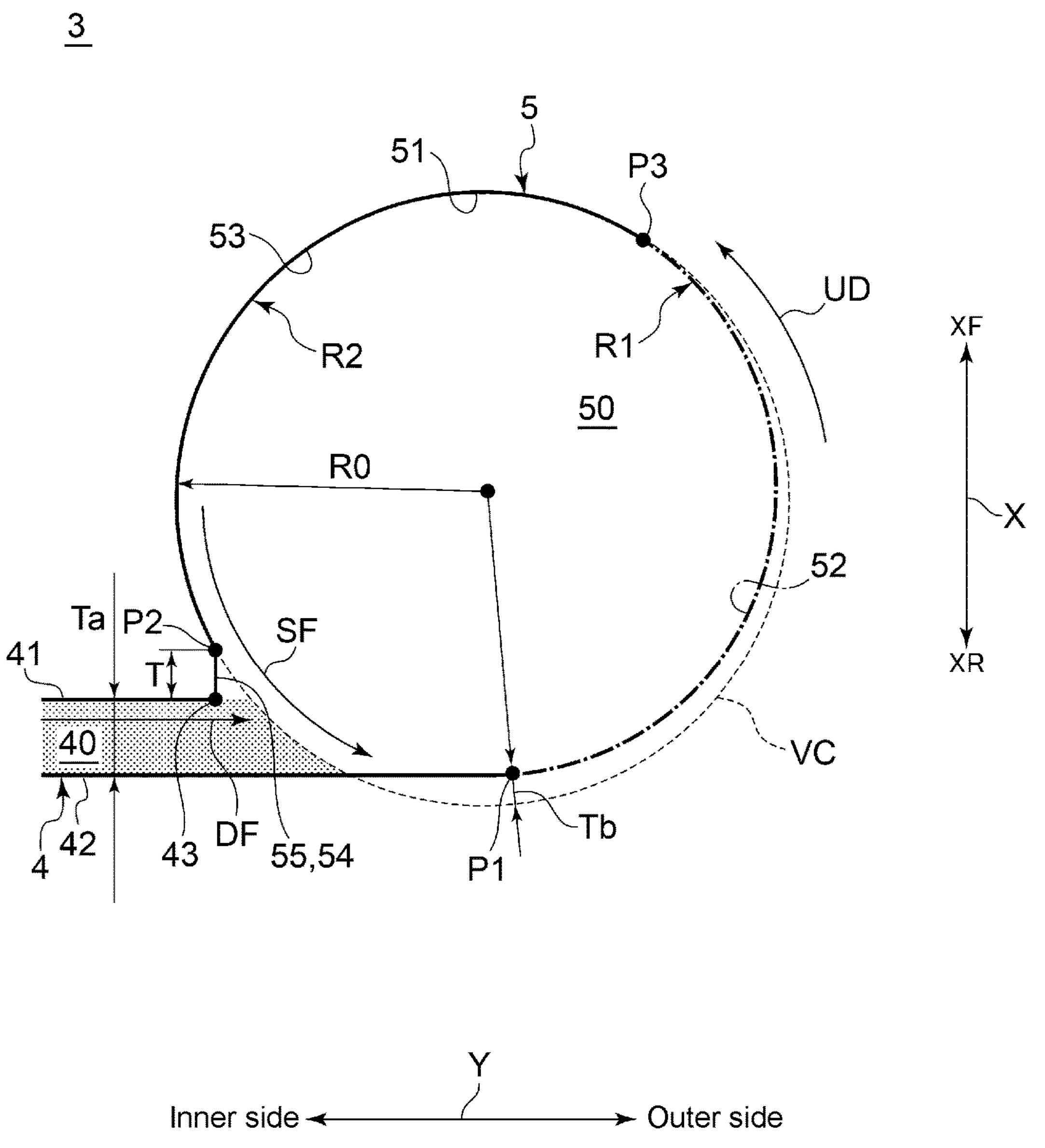
FIG. 6 is an explanatory diagram for describing the shape of the diffuser portion and the scroll portion of the scroll casing according to an embodiment.

FIGS. 3 to 6 are each an explanatory diagram for describing the shape of the diffuser portion and the scroll portion of the scroll casing according to an embodiment. FIGS. 3 and 6 schematically show a cross-section taken along the axis CA of the centrifugal compressor 1.

As shown in FIGS. 3 to 6, the passage width of the diffuser passage 40 along the axial direction X of the centrifugal compressor 1 is defined as Ta, and the shortest distance from a start position P1 which is a connection position with the hub-side passage surface 42 of the diffuser passage 40 on the inner peripheral surface 51 of the scroll portion 5 to a virtual arc VC that touches an end position P2 which is a position opposite to the start position P1 on the inner peripheral surface 51 is defined as Tb. The shortest distance Tb is positive from the start position P1 to the front side XF and negative from the start position P1 to the rear side XR.

The start position P1 is the rear side XR end of the inner peripheral surface 51 in the axial direction X, where the curvature radius changes from infinite (straight line) to finite. Further, the end position P2 is positioned on the one-direction UD side of the start position P1. Here, the one-direction UD is the counterclockwise direction centered at the center SC of the scroll passage 50 in a cross-section along the axis CA of the centrifugal compressor 1 (on the outer side of the center SC in the radial direction Y, a direction from the rear side XR to the front side XF in the circumferential direction around the center SC, and on the inner side of the center SC in the radial direction Y, a direction from the front side XF to the rear side XR in the circumferential direction around the center SC), and the one-direction UD side is the downstream side.

In the embodiments shown in FIGS. 3 to 6, in a cross-section along the axis CA of the centrifugal compressor 1, the inner peripheral surface 51 has a first arc portion 52 extending from the start position P1 to the one-direction UD side, and a second arc portion 53 formed on the one-direction UD side of the first arc portion 52 so as to include at least the end position P2. In FIGS. 3 to 6, the first arc portion 52 is indicated by the dotted and dashed line. The first arc portion 52 is formed to have a constant curvature radius R1 from the upstream end to the downstream end in the one-direction UD. Further, the second arc portion 53 is formed to have a constant curvature radius R2 from the upstream end to the downstream end in the one-direction UD. The virtual arc VC touches the second arc portion 53 including the end position P2, and has a curvature radius R0 that is the same as the curvature radius R2. The upstream end of the second arc portion 53 is smoothly connected to the downstream end of the first arc portion 52 at the connection position P3 with the downstream end of the first arc portion 52.

The shape of the inner peripheral surface 51 is not limited to the illustrated embodiments. For example, the inner peripheral surface 51 may be formed so that its curvature continuously decreases toward the one-direction UD side.

As shown in FIGS. 3 to 6, the scroll casing 3 has a diffuser outlet jaw portion 54 including the second arc portion 53 (inner peripheral surface 51) including the end position P2 and the shroud-side passage surface 41 of the diffuser passage 40. In the illustrated embodiment, the diffuser outlet jaw portion 54 further includes an inner wall surface 55 having a length T along the axial direction X. The inner wall surface 55 is connected at one end to the downstream end of the second arc portion 53 at the end position P2, and is connected at the other end to the downstream end 43 of the shroud-side passage surface 41. In the illustrated embodiment, in a cross-section along the axis CA of the centrifugal compressor 1, the inner wall surface 55 extends linearly along the axial direction, but the inner wall surface 55 is not limited to this shape. The inner wall surface 55 may, for example, be curved convexly toward the outer side in the radial direction. Further, if the passage width of the diffuser passage 40 is not constant, the passage width at the outlet (communication port with the scroll passage 50) 44 of the diffuser passage 40 including the downstream end 43 of the shroud-side passage surface 41 may be employed as the passage width Ta of the diffuser passage 40.

As shown in FIGS. 3 to 6, a fluid flowing from the outlet of the diffuser passage 40 into the scroll passage 50 has a swirl velocity component, which forms a swirling flow SF flowing toward the one-direction UD side along the inner peripheral surface 51. Such a swirling flow SF flows along the first arc portion 52 and the second arc portion 53 and then merges with the outlet flow DF of the diffuser passage 40 flowing from the outlet of the diffuser passage 40 into the scroll passage 50 downstream of the diffuser outlet jaw portion 54.

The swirling flow SF flows downstream of the diffuser outlet jaw portion 54 along the virtual arc VC. The cross-sectional shape of the scroll casing 3 shown in FIG. 3 satisfies a condition of $Tb/Ta=1.0$. The cross-sectional shape of the scroll casing 3 shown in FIG. 4 satisfies a condition of $Tb/Ta=1.5$. As shown in FIGS. 3 and 4, when $Tb/Ta \geq 1.0$, the swirling flow SF downstream of the diffuser outlet jaw portion 54 can have a gentle inclination angle with respect to the outlet flow DF, so that the interference between the swirling flow SF and the outlet flow DF at the merging portion with the outlet flow DF can be effectively suppressed. As the value of Tb/Ta increases larger than 1.0, the thickness T of the diffuser outlet jaw portion increases, and thus the possibility that a low flow velocity region, called a wake, WA, occurs at a position immediately downstream of the diffuser outlet jaw portion 54 in the scroll passage 50 increases. When the wake is large, wake loss of the swirling flow SF increases, which may lead to a reduction in the efficiency of the centrifugal compressor 1. For this reason, in order to suppress the wake loss of the swirling flow SF, it is preferable not to make the value of Tb/Ta excessively larger than 1.0. The scroll casing 3 preferably satisfies a relationship of $Tb/Ta \leq 1.75$, and more preferably satisfies a relationship of $Tb/Ta \leq 1.60$.

The cross-sectional shape of the scroll casing 3 shown in FIG. 5 satisfies a condition of $Tb/Ta=0.5$. The cross-sectional shape of the scroll casing 3 shown in FIG. 6 satisfies a condition of $Tb/Ta<0$. As shown in FIGS. 5 and 6, as the value of Tb/Ta decreases smaller than 1.0, the degree of interference between the swirling flow SF downstream of the diffuser outlet jaw portion 54 and the outlet flow DF of the diffuser passage 40 flowing into the scroll passage 50 increases, and the degree of blockage of the outlet flow DF of the diffuser passage 40 increases. In FIG. 5, the swirling flow SF downstream of the diffuser outlet jaw portion 54 blocks the shroud side (front side XF) of the outlet flow DF, whereas in FIG. 6, the swirling flow SF downstream of the diffuser outlet jaw portion 54 blocks the outlet flow DF from the shroud side to the hub side (rear side XR). When at least the shroud side of the outlet flow DF is blocked, the resistance of the fluid passing through the diffuser passage 40 increases, which may induce diffuser stall. When the diffuser stall is induced, the efficiency of the centrifugal compressor 1 is extremely reduced, and surge is induced due to the diffuser stall, resulting in a reduction in the operating range of the centrifugal compressor 1. Further, as the value of Tb/Ta decreases, the thickness T of the diffuser outlet jaw portion 54 increases, but if the thickness T is too small, the diffuser outlet jaw portion 54 may chip undesirably. The adverse effect on the efficiency of the centrifugal compressor 1 due to the wake loss of the swirling flow SF is smaller than the adverse effect on the efficiency of the centrifugal compressor 1 due to the blockage of the outlet flow DF. Therefore, the value of Tb/Ta is preferably larger than 1.0 rather than smaller than 1.0.

Figure 7:
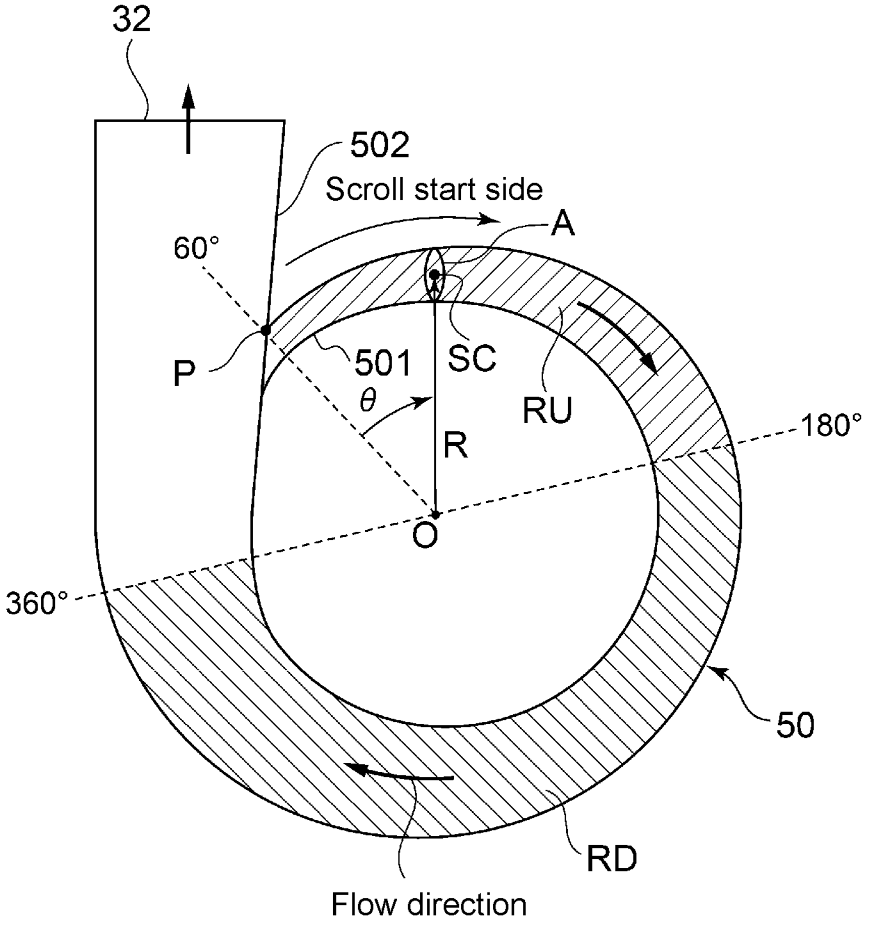
FIG. 7 is a schematic diagram of the scroll passage when the centrifugal compressor according to an embodiment is viewed in the axial direction.

FIG. 7 is a schematic diagram of the scroll passage when the centrifugal compressor according to an embodiment is viewed in the axial direction. As shown in FIG. 7, with respect to an angular position θ around the scroll center O of the scroll passage 50, the merging position P between the scroll start 501 and the scroll end 502 of the scroll passage 50 is defined as 60 degrees, and the angular position θ is defined so that the angle gradually increases from the merging position P to the downstream side of the scroll passage 50 (clockwise around the scroll center O in the figure). Further, the range of the angular position θ from 60 degrees to 180 degrees is defined as an upstream range RU, and the range of the angular position θ from 180 degrees to 360 degrees is defined as a downstream range RD. Further, as shown in FIG. 7, in a cross-section obtained by cutting the scroll passage 50 along a plane including the axis CA of the centrifugal compressor 1 at a circumferential position where the angular position is θ, the cross-sectional area of the scroll passage 50 is defined as A, and the distance from the scroll center O to the center SC of the cross-section of the scroll passage 50 is defined as R. The scroll passage 50 is formed so that A/R increases as the angular position θ increases. In an embodiment, the scroll passage 50 is formed so that the value of A/R increases with a constant slope in at least one of the upstream range RU or the downstream range RD.

Figure 8:
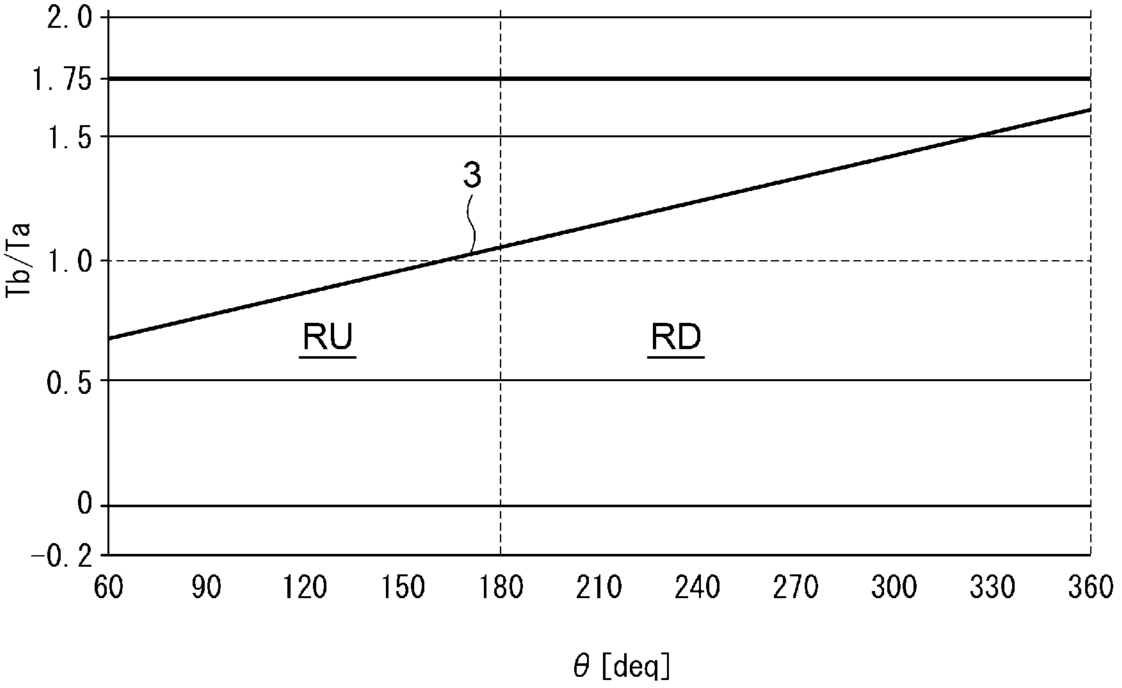
FIG. 8 is an explanatory diagram for describing the scroll casing according to an embodiment and shows a relationship between the angular position in the scroll passage and the distance ratio Tb/Ta.

FIG. 8 is an explanatory diagram for describing the scroll casing according to an embodiment and shows a relationship between the angular position in the scroll passage and the distance ratio Tb/Ta. In FIG. 8, the horizontal axis represents the angular position θ, and the vertical axis represents the distance ratio Tb/Ta. In the embodiment shown in FIG. 8, as the angular position θ of the scroll casing 3 increases, A/R increases, and Tb/Ta increases accordingly.

As shown in FIG. 8, the scroll casing 3 according to some embodiments satisfies the relationship of Tb/Ta≥1.0 in the range of the angular position θ from 180 degrees to 360 degrees, i.e., in the downstream range RD.

If the value of Tb/Ta is too small (if the relationship of Tb/Ta<1.0 is satisfied), the outlet flow DF of the diffuser passage 40 and the swirling flow SF in the scroll passage 50 interfere with each other, so that the resistance of the fluid passing through the diffuser passage 40 increases, which may induce diffuser stall. When the diffuser stall is induced, the efficiency of the centrifugal compressor 1 is extremely reduced, and surge is induced due to the diffuser stall, resulting in a reduction in the operating range of the centrifugal compressor 1. In order to avoid this, it is preferable to satisfy the relationship of Tb/Ta≥1.0. With the above configuration, since the scroll casing 3 satisfies the relationship of Tb/Ta≥1.0 in the range of the angular position θ from 180 degrees to 360 degrees (downstream range RD), the interference between the outlet flow DF of the diffuser passage 40 and the swirling flow SF in the scroll passage 50 can be suppressed in the downstream range RD. As a result, since the blockage of the diffuser passage 40 can be suppressed, it is possible to suppress the reduction in the efficiency of the centrifugal compressor 1 and the reduction in the operating range.

In some embodiments, as shown in FIG. 8, the scroll casing 3 satisfies the relationship of Tb/Ta≥0.5 in the range of the angular position from 60 degrees to 180 degrees, i.e., in the upstream range RU.

In order to suppress the interference between the outlet flow DF of the diffuser passage 40 and the swirling flow SF in the scroll passage 50, it is preferable that Tb/Ta≥1.0 is satisfied even in the range of the angular position θ of the scroll casing 3 from 60 degrees to 180 degrees (upstream range RU). However, since the cross-sectional area A of the scroll passage 50 decreases toward the scroll start 501 of the scroll passage 50, it may be difficult to satisfy the relationship of Tb/Ta≥1.0 in the upstream range RU. With the above configuration, the relationship of Tb/Ta≥0.5 is satisfied in the range of the angular position θ from 60 degrees to 180 degrees (upstream range RU). In this case, the interference between the outlet flow DF of the diffuser passage 40 and the swirling flow SF in the scroll passage 50 can be suppressed in the upstream range RU. As a result, since the blockage of the diffuser passage 40 can be suppressed, it is possible to suppress the reduction in the efficiency of the centrifugal compressor 1 and the reduction in the operating range. In some embodiments, the scroll casing 3 may be formed so as to satisfy the relationship of Tb/Ta≥1.0 in the upstream range RU and the downstream range RD. In this case, the interference between the outlet flow DF and the swirling flow SF can be effectively suppressed.

In some embodiments, as shown in FIG. 8, the scroll casing 3 satisfies the relationship of Tb/Ta≤1.75 in the range of the angular position θ from 180 degrees to 360 degrees, i.e., in the downstream range RD.

If the value of Tb/Ta is too large (if the relationship of Tb/Ta>1.75 is satisfied), as the thickness T of the diffuser outlet jaw portion 54 increases, the above-described region WA expands, and the wake loss increases, which may lead to a reduction in the efficiency of the centrifugal compressor 1. With the above configuration, the relationship of Tb/Ta≤1.75 is satisfied in the range of the angular position θ from 180 degrees to 360 degrees (downstream range RD). In this case, it is possible to suppress the reduction in the efficiency of the centrifugal compressor 1 due to the wake loss in the downstream range RD. In some embodiments, the scroll casing 3 satisfies the relationship of Tb/Ta≤1.75 in the upstream range RU and the downstream range RD. In this case, it is possible to suppress the reduction in the efficiency of the centrifugal compressor 1 due to the wake loss in the upstream range RU and the downstream range RD.

(Intersection Angle α)

Figure 9:
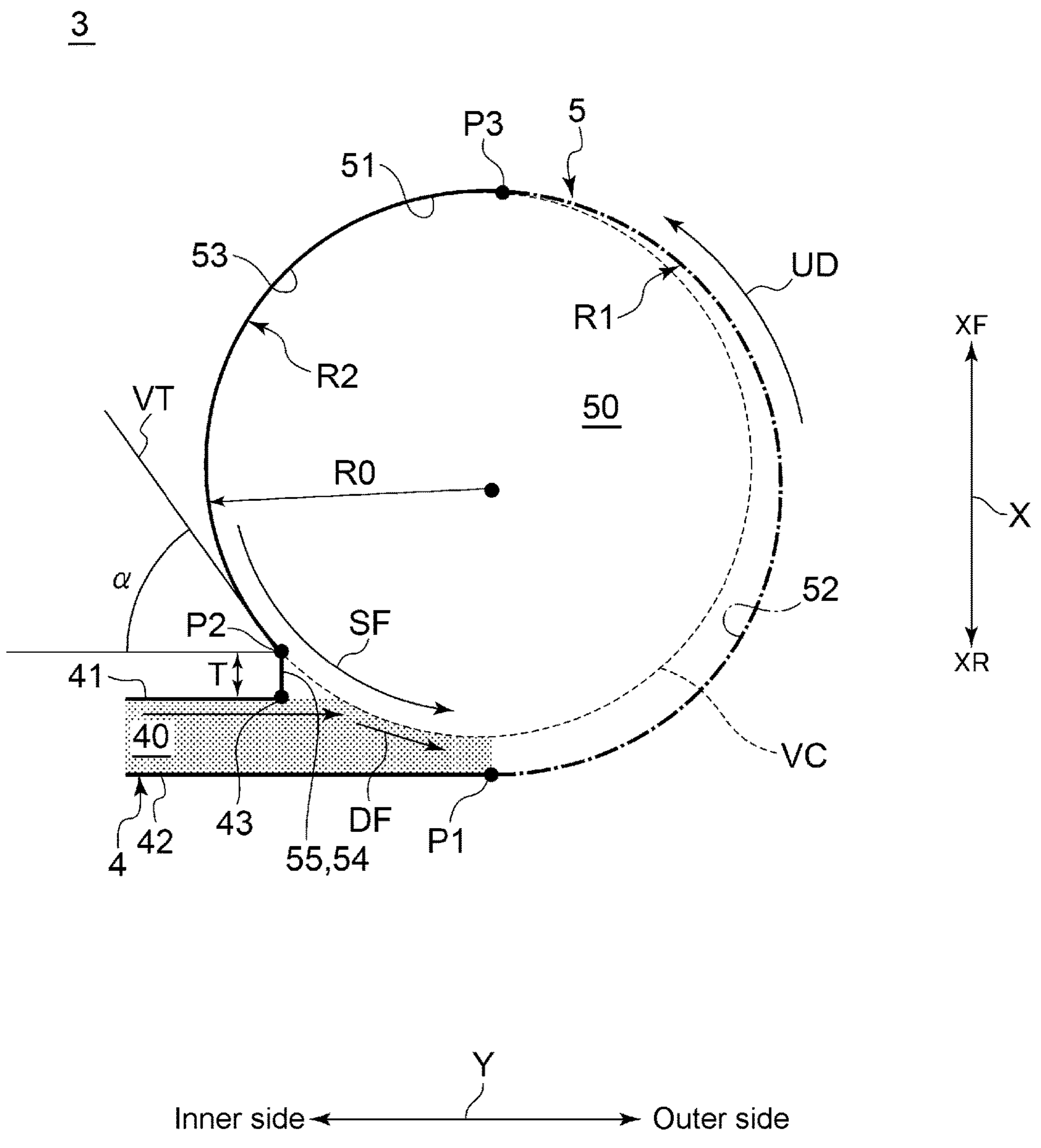
FIG. 9 is an explanatory diagram for describing the shape of the diffuser portion and the scroll portion of the scroll casing according to an embodiment.

FIG. 9 is an explanatory diagram for describing the shape of the diffuser portion and the scroll portion of the scroll casing according to an embodiment. As shown in FIG. 9, the intersection angle between a virtual tangent line VT that touches the end position P2 of the inner peripheral surface 51 of the scroll portion 5 and the radial direction Y of the centrifugal compressor 1 is defined as α. Although two intersection angles are formed by the virtual tangent line VT and the radial direction Y, the smaller one of the two intersection angles is defined as the intersection angle α.

In the above-described embodiments, the distance ratio Tb/Ta is used as the parameter value related to the shape of the scroll casing 3, but in other embodiments, the intersection angle α may be used as the parameter value. As the intersection angle α increases, the inclination angle of the swirling flow SF downstream of the diffuser outlet jaw portion 54 with respect to the outlet flow DF increases according to the intersection angle α. When the inclination angle increases, the degree of interference between the swirling flow SF and the outlet flow DF increases, and the degree of blockage of the outlet flow DF of the diffuser passage 40 increases. For this reason, in order to suppress the blockage of the outlet flow DF, it is preferable to make the intersection angle α small. The scroll casing 3 preferably satisfies a relationship of intersection angle α≤70°, and more preferably satisfies a relationship of intersection angle α≤50°.

Figure 10:
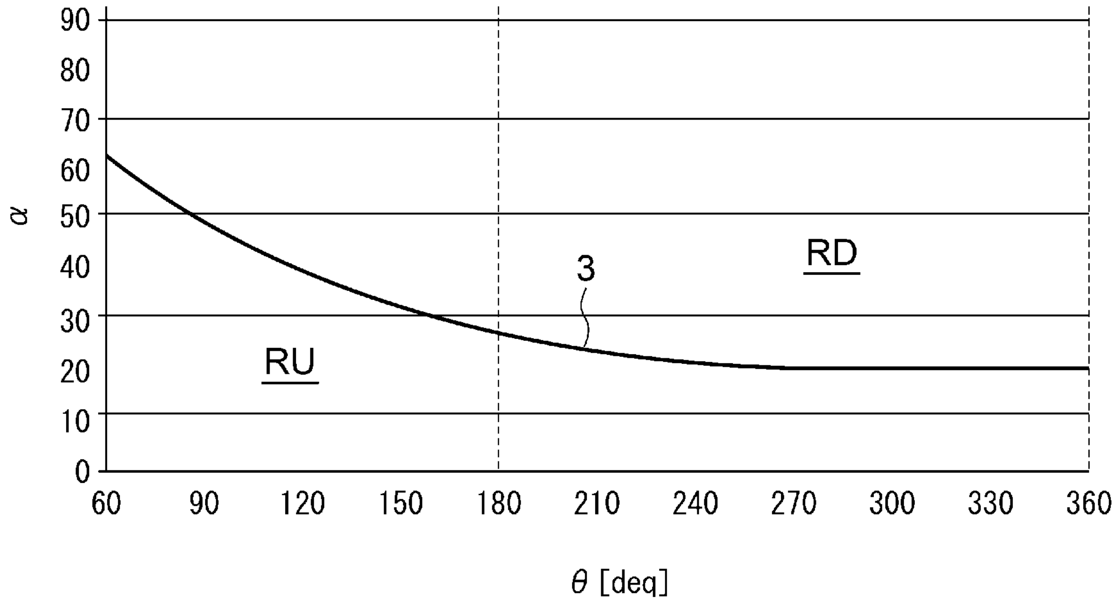
FIG. 10 is an explanatory diagram for describing the scroll casing according to an embodiment and shows a relationship between the angular position in the scroll passage and the intersection angle $\alpha$.

FIG. 10 is an explanatory diagram for describing the scroll casing according to an embodiment and shows a relationship between the angular position in the scroll passage and the intersection angle α. In FIG. 10, the horizontal axis represents the angular position θ, and the vertical axis represents the intersection angle α. In the embodiment shown in FIG. 10, as the angular position θ of the scroll casing 3 increases, the intersection angle α decreases.

As shown in FIG. 10, the scroll casing 3 according to some embodiments satisfies the relationship of α≤50° in the range of the angular position θ from 180 degrees to 360 degrees, i.e., in the downstream range RD.

If the intersection angle α is too large, the outlet flow DF of the diffuser passage 40 and the swirling flow SF in the scroll passage 50 interfere with each other, so that the resistance of the fluid passing through the diffuser passage 40 increases, which may induce diffuser stall. When the diffuser stall is induced, the efficiency of the centrifugal compressor 1 is extremely reduced, and surge is induced due to the diffuser stall, resulting in a reduction in the operating range of the centrifugal compressor 1. In order to avoid this, it is preferable to satisfy the relationship of α≤50°. With the above configuration, since the scroll casing 3 satisfies the relationship of α≤50° in the range of the angular position θ from 180 degrees to 360 degrees (downstream range RD), the interference between the outlet flow DF of the diffuser passage 40 and the swirling flow SF in the scroll passage 40 can be suppressed in the downstream range RD. As a result, since the blockage of the diffuser passage 40 can be suppressed, it is possible to suppress the reduction in the efficiency of the centrifugal compressor 1 and the reduction in the operating range. The present embodiment can be implemented independently.

In some embodiments, as shown in FIG. 10, the scroll casing 3 satisfies the relationship of $\alpha \leq 70°$ in the range of the angular position from 60 degrees to 180 degrees, i.e., in the upstream range RU.

In order to suppress the interference between the outlet flow DF of the diffuser passage 40 and the swirling flow SF in the scroll passage 50, it is preferable that the relationship of $\alpha \leq 50°$ is satisfied even in the range of the angular position $\theta$ of the scroll casing 3 from 60 degrees to 180 degrees (upstream range RU). However, since the cross-sectional area A of the scroll passage 50 decreases toward the scroll start 501 of the scroll passage 50, it may be difficult to satisfy the relationship of $\alpha \leq 50°$ in the upstream range RU. With the above configuration, the relationship of $\alpha \leq 70°$ is satisfied in the range of the angular position $\theta$ from 60 degrees to 180 degrees (upstream range RU). In this case, the interference between the outlet flow DF of the diffuser passage 40 and the swirling flow SF in the scroll passage 50 can be suppressed in the upstream range RU. As a result, since the blockage of the diffuser passage 40 can be suppressed, it is possible to suppress the reduction in the efficiency of the centrifugal compressor 1 and the reduction in the operating range. In some embodiments, the scroll casing 3 may be formed so as to satisfy the relationship of $\alpha \leq 50°$ in the upstream range RU and the downstream range RD. In this case, the interference between the outlet flow DF and the swirling flow SF can be effectively suppressed.

In the above-described embodiments, either one of the distance ratio Tb/Ta or the intersection angle $\alpha$ is used as the parameter value related to the shape of the scroll casing 3, but in other embodiments, both the distance ratio Tb/Ta and the intersection angle $\alpha$ may be used as the parameter values.

In some embodiments, the scroll casing 3 satisfies the relationship of $Tb/Ta \geq 1.0$ and $\alpha \leq 50°$ in the range of the angular position $\theta$ from 180 degrees to 360 degrees, i.e., in the downstream range RD.

With the above configuration, since the scroll casing 3 satisfies not only $Tb/Ta \geq 1.0$ but also $\alpha \leq 50°$ in the range of the angular position $\theta$ from 180 degrees to 360 degrees (downstream range RD), compared to the case where only $Tb/Ta \geq 1.0$ is satisfied, the interference between the outlet flow DF of the diffuser passage 40 and the swirling flow SF in the scroll passage 50 can be suppressed in the downstream range RD more effectively. As a result, since the blockage of the diffuser passage 40 can be effectively suppressed, it is possible to effectively suppress the reduction in the efficiency of the centrifugal compressor 1 and the reduction in the operating range.

In some embodiments, the scroll casing 3 satisfies the relationship of $Tb/Ta \geq 0.5$ and $\alpha \leq 70°$ in the range of the angular position $\theta$ from 60 degrees to 180 degrees, i.e., in the upstream range RU.

With the above configuration, since the scroll casing 3 satisfies not only $Tb/Ta \geq 0.5$ but also $\alpha \leq 70°$ in the range of the angular position $\theta$ from 60 degrees to 180 degrees (upstream range RU), compared to the case where only $Tb/Ta \geq 0.5$ is satisfied, the interference between the outlet flow DF of the diffuser passage 40 and the swirling flow SF in the scroll passage 50 can be suppressed in the upstream range RU more effectively. As a result, since the blockage of the diffuser passage 40 can be effectively suppressed, it is possible to effectively suppress the reduction in the efficiency of the centrifugal compressor 1 and the reduction in the operating range.

(Change in Shape of Scroll Passage in Circumferential Direction)

Figure 11:
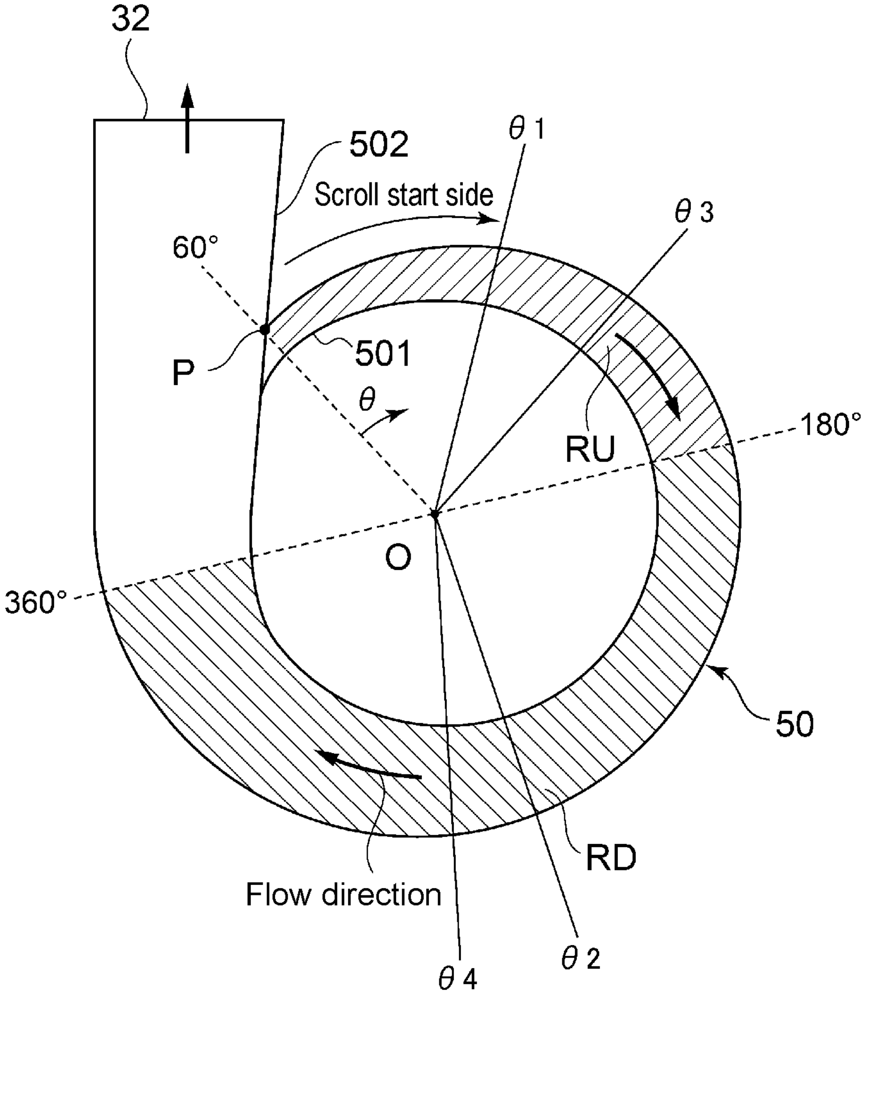
FIG. 11 is a schematic diagram of the scroll passage when the centrifugal compressor according to an embodiment is viewed in the axial direction.
Figure 12:
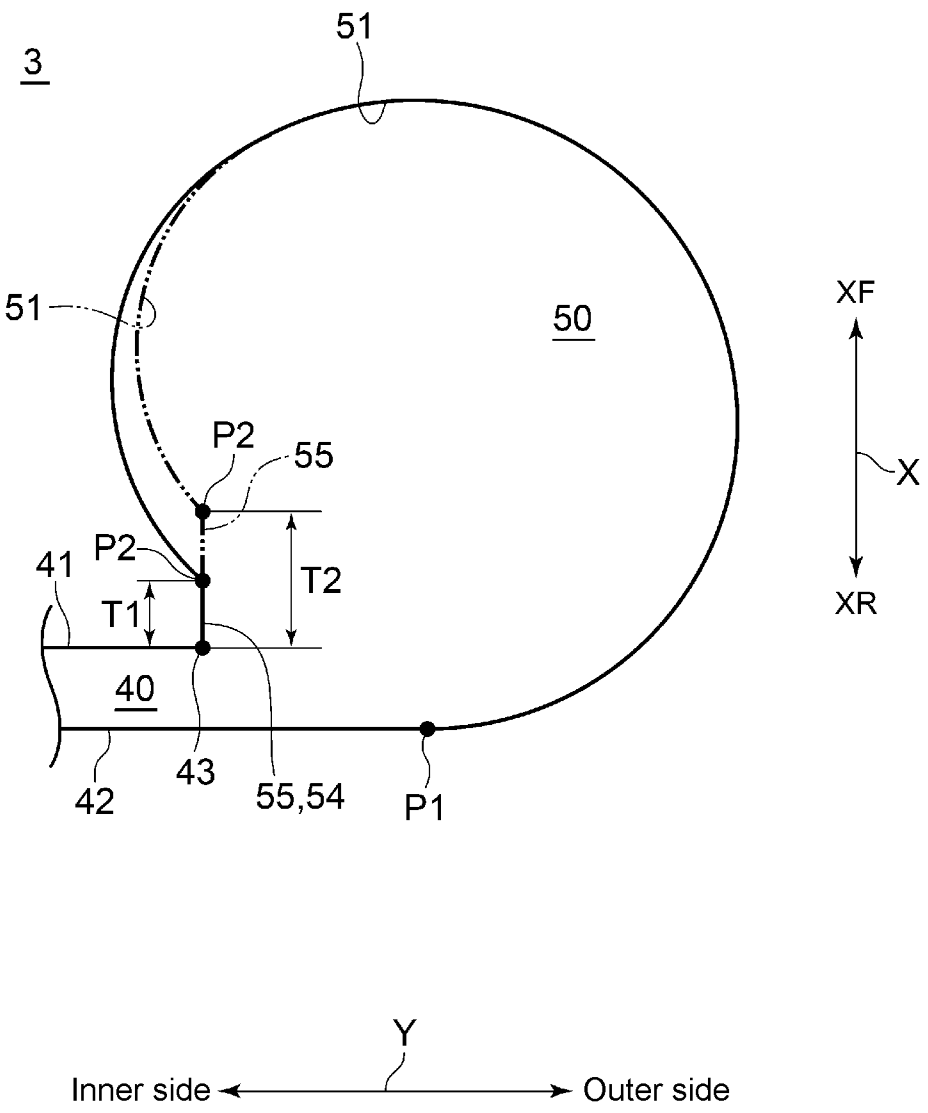
FIG. 12 is an explanatory diagram for describing the shape of the diffuser portion and the scroll portion at angular positions $\theta 1$, $\theta 2$ of the scroll casing according to an embodiment.

FIG. 11 is a schematic diagram of the scroll passage when the centrifugal compressor according to an embodiment is viewed in the axial direction. As shown in FIG. 11, the angular position $\theta$ includes an angular position $\theta 1$, and an angular position $\theta 2$ that is larger than the angular position $\theta 1$. FIG. 12 is an explanatory diagram for describing the shape of the diffuser portion and the scroll portion at angular positions $\theta 1$, $\theta 2$ of the scroll casing according to an embodiment. FIG. 12 schematically shows the scroll casing 3 at the angular positions $\theta 1$, $\theta 2$. In FIG. 12, the inner peripheral surface 51 and the inner wall surface 55 of the scroll portion 5 at the angular position $\theta 1$ are indicated by the solid line, and the inner peripheral surface 51 and the inner wall surface 55 of the scroll portion 5 at the angular position $\theta 2$ are indicated by the two-dotted dashed line.

In some embodiments, as shown in FIG. 12, the scroll casing 3 satisfies a relationship of $T1 < T2$, where T1 is the length along the axial direction of the centrifugal compressor between the end position P2 and the downstream end 43 of the shroud-side passage surface 41 of the diffuser passage 40 at a position where the angular position is $\theta 1$, and T2 is the length along the axial direction between the end position P2 and the downstream end 43 of the shroud-side passage surface 41 at a position where the angular position is $\theta 2$ that is larger than $\theta 1$. In the illustrated embodiment, the scroll passage 50 is formed so that the length T increases continuously or stepwise from the scroll start 501 to the scroll end 502.

Normally, the length T along the axial direction of the centrifugal compressor 1 between the end position P2 and the downstream end 43 of the shroud-side passage surface 41 of the diffuser passage 40 is set uniformly in the circumferential direction of the centrifugal compressor 1. In this case, if Tb/Ta and the intersection angle $\alpha$ satisfy the above-described relationship at every angular position $\theta$, the shape of the scroll passage 50 in the vicinity of the scroll end 502 becomes inappropriate, which may lead to a reduction in the efficiency of the centrifugal compressor 1. With the above configuration, since the length T2 of the scroll casing 3 at the angular position $\theta 2$ is longer than the length T1 at the angular position $\theta 1$, while maintaining the above-described relationship of Tb/Ta and the intersection angle $\alpha$ at every angular position $\theta$, the scroll passage 50 can be shaped appropriately at every angular position $\theta$. Thus, it is possible to suppress the reduction in the efficiency of the centrifugal compressor 1.

Figure 13:
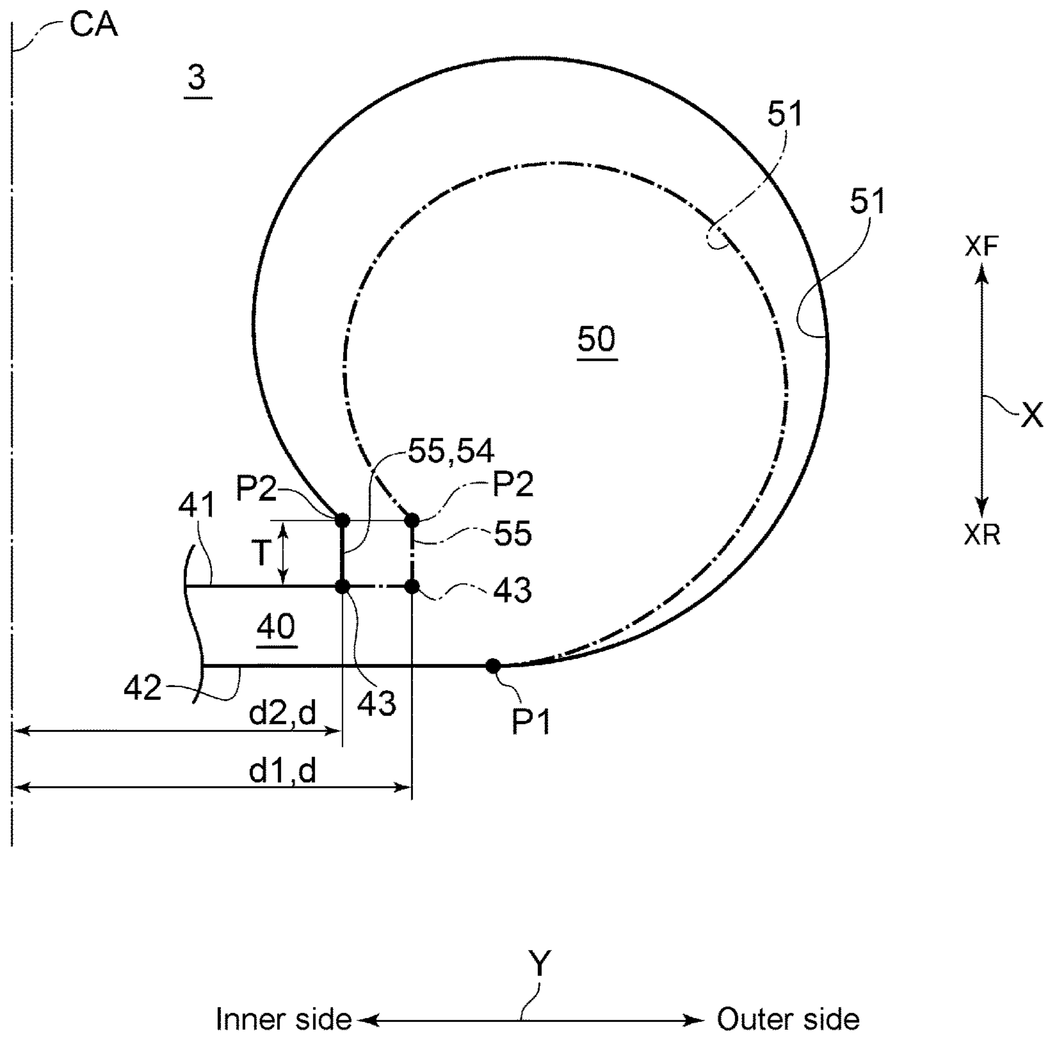
FIG. 13 is an explanatory diagram for describing the shape of the diffuser portion and the scroll portion at angular positions $\theta 3$, $\theta 4$ of the scroll casing according to an embodiment.
Figure 14:
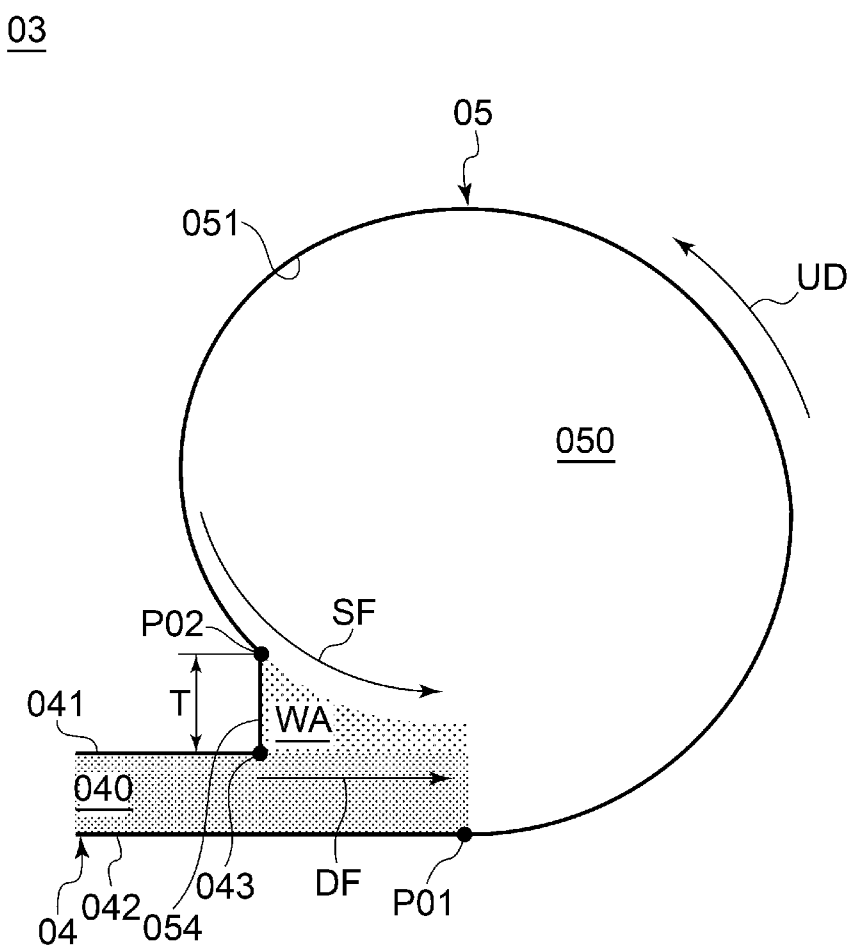
FIG. 14 is an explanatory diagram for describing the shape of the diffuser portion and the scroll portion of the scroll casing according to a comparative example.
Figure 15:
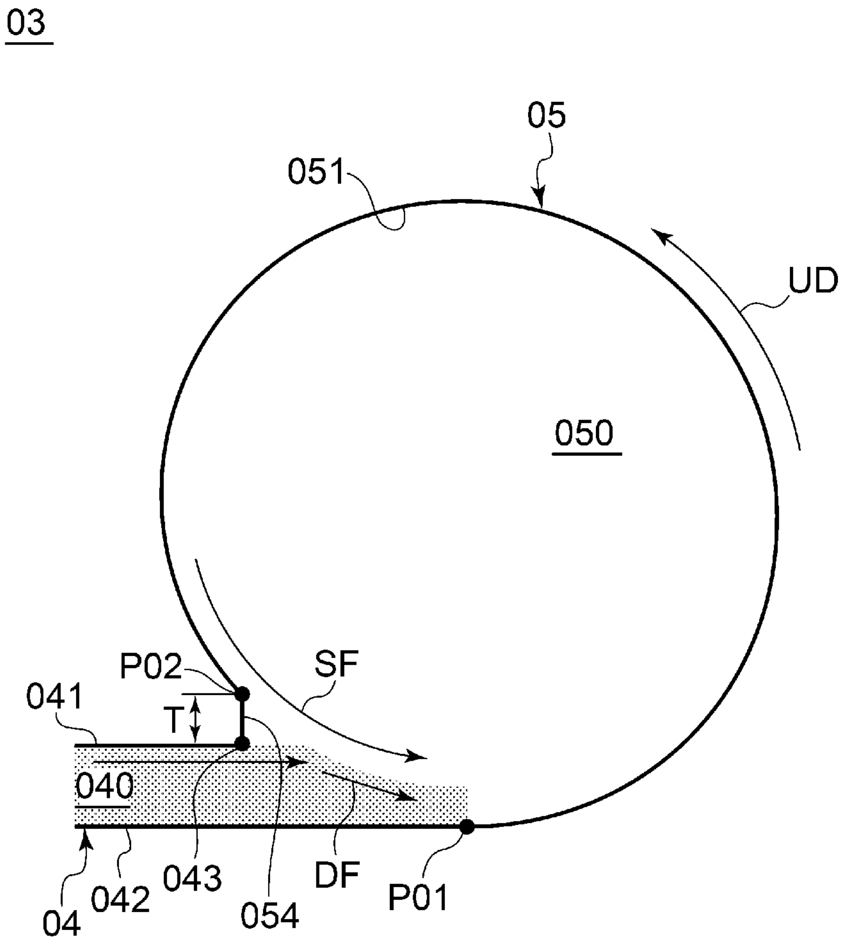
FIG. 15 is an explanatory diagram for describing the shape of the diffuser portion and the scroll portion of the scroll casing according to a comparative example.

As shown in FIG. 11, the angular position $\theta$ includes an angular position $\theta 3$, and an angular position $\theta 4$ that is larger than the angular position $\theta 3$. FIG. 13 is an explanatory diagram for describing the shape of the diffuser portion and the scroll portion at angular positions $\theta 3$, $\theta 4$ of the scroll casing according to an embodiment. FIG. 13 schematically shows the scroll casing 3 at the angular positions $\theta 3$, $\theta 4$. In FIG. 13, the inner peripheral surface 51 and the inner wall surface 55 of the scroll portion 5 at the angular position $\theta 3$ are indicated by the dotted and dashed line, and the inner peripheral surface 51 and the inner wall surface 55 of the scroll portion 5 at the angular position $\theta 4$ are indicated by the solid line.

In some embodiments, as shown in FIG. 13, the scroll casing 3 satisfies a relationship of $d1 > d2$, where d1 is the length along the radial direction of the centrifugal compressor 1 from the axis CA of the centrifugal compressor 1 to the downstream end 43 of the shroud-side passage surface 41 of the diffuser passage 40 at a position where the angular position is θ3, and d2 is the length along the radial direction from the axis CA to the downstream end 43 of the shroud-side passage surface 41 at a position where the angular position is θ4 that is larger than θ3. In the illustrated embodiment, the diffuser passage 40 is formed so that the length d along the radial direction of the centrifugal compressor 1 from the axis CA of the centrifugal compressor 1 to the downstream end 43 of the shroud-side passage surface 41 increases continuously or stepwise from the scroll start 501 to the scroll end 502.

Normally, the length d along the radial direction of the centrifugal compressor 1 from the axis CA of the centrifugal compressor 1 to the downstream end 43 of the shroud-side passage surface 41 of the diffuser passage 40 is set uniformly in the circumferential direction of the centrifugal compressor 1. In this case, if Tb/Ta and the intersection angle α satisfy the above-described relationship at every angular position θ, the shape of the scroll passage 50 in the vicinity of the scroll end becomes inappropriate, which may lead to a reduction in the efficiency of the centrifugal compressor 1. With the above configuration, since the length d2 of the scroll casing 3 at the angular position θ4 is longer than the length d1 at the angular position θ3, while maintaining the above-described relationship, the scroll passage 50 can be shaped appropriately at every angular position θ. Thus, it is possible to suppress the reduction in the efficiency of the centrifugal compressor 1.

In the embodiment shown in FIG. 13, the length T is the same at the angular positions θ3 and θ4, but as in the above-described embodiments, the length T at the angular position θ4 may be longer than the length T at the angular position θ3.

The centrifugal compressor 1 according to some embodiments includes the above-described scroll casing 3. In this case, the scroll casing 3 can suppress the interference between the outlet flow DF of the diffuser passage 40 and the swirling flow SF in the scroll passage 50. As a result, since the blockage of the diffuser passage 40 can be suppressed, it is possible to suppress the reduction in the efficiency of the centrifugal compressor 1 and the reduction in the operating range.

The present disclosure is not limited to the embodiments described above, but includes modifications to the embodiments described above, and embodiments composed of combinations of those embodiments.

The contents described in the above embodiments would be understood as follows, for instance.

1) A scroll casing (3) according to at least one embodiment of the present disclosure is a scroll casing (3) for a centrifugal compressor (1), including: a diffuser portion (4) forming a diffuser passage (40) of the centrifugal compressor (1); and a scroll portion (5) forming a scroll passage (50) of the centrifugal compressor (1), in which a relationship of Tb/Ta≥1.0 is satisfied in a range (downstream range RD) of an angular position (θ) around a scroll center (O) of the scroll passage (50) from 180 degrees to 360 degrees, where Ta is a passage width of the diffuser passage (40) along an axial direction of the centrifugal compressor (1), Tb is a shortest distance from a start position (P1) which is a connection position with a hub-side passage surface (42) of the diffuser passage (40) on an inner peripheral surface (51) of the scroll portion (5) to a virtual arc (VC) that touches an end position (P2) which is a position opposite to the start position (P1) on the inner peripheral surface (51), and the angular position (θ) is defined so that the angle gradually increases from a merging position (P) between a scroll start (501) and a scroll end (502) of the scroll passage (50) of 60 degrees to a downstream side of the scroll passage (50).

If the value of Tb/Ta is too small (if the relationship of Tb/Ta<1.0 is satisfied), the outlet flow (DF) of the diffuser passage and the swirling flow (SF) in the scroll passage interfere with each other, so that the resistance of the fluid passing through the diffuser passage (40) increases, which may induce diffuser stall. When the diffuser stall is induced, the efficiency of the centrifugal compressor (1) is extremely reduced, and surge is induced due to the diffuser stall, resulting in a reduction in the operating range of the centrifugal compressor (1). In order to avoid this, it is preferable to satisfy the relationship of Tb/Ta≥1.0. With the above configuration 1), since the scroll casing (3) satisfies the relationship of Tb/Ta≥1.0 in the range of the angular position (θ) from 180 degrees to 360 degrees (downstream range RD), the interference between the outlet flow (DF) of the diffuser passage and the swirling flow (SF) in the scroll passage can be suppressed in the downstream range. As a result, since the blockage of the diffuser passage (40) can be suppressed, it is possible to suppress the reduction in the efficiency of the centrifugal compressor (1) and the reduction in the operating range.

2) In some embodiments, in the scroll casing (3) described in 1), a relationship of Tb/Ta≥0.5 is satisfied in a range of the angular position (θ) from 60 degrees to 180 degrees (upstream range RU).

With the above configuration 2), the relationship of Tb/Ta≥0.5 is satisfied in the range of the angular position (θ) from 60 degrees to 180 degrees (upstream range RU). In this case, the interference between the outlet flow (DF) of the diffuser passage and the swirling flow (SF) in the scroll passage can be suppressed in the upstream range (RU). As a result, since the blockage of the diffuser passage (40) can be suppressed, it is possible to suppress the reduction in the efficiency of the centrifugal compressor (1) and the reduction in the operating range.

3) In some embodiments, in the scroll casing (3) described in 1) or 2), a relationship of Tb/Ta≤1.75 is satisfied in a range of the angular position (θ) from 180 degrees to 360 degrees (downstream range RD).

If the value of Tb/Ta is too large (if the relationship of Tb/Ta>1.75 is satisfied), as the thickness (T) of the diffuser outlet jaw portion (54) increases, the wake loss increases, which may lead to a reduction in the efficiency of the centrifugal compressor (1). With the above configuration 3), the relationship of Tb/Ta≤1.75 is satisfied in the range of the angular position (θ) from 180 degrees to 360 degrees (downstream range RD). In this case, it is possible to suppress the reduction in the efficiency of the centrifugal compressor (1) due to the wake loss in the downstream range (RD).

4) In some embodiments, in the scroll casing (3) described in any one of 1) to 3), a relationship of α≤50° is satisfied in a range of the angular position (θ) from 180 degrees to 360 degrees (downstream range RD), where a is an intersection angle between a virtual tangent line (VT) that touches the end position (P2) of the inner peripheral surface (51) of the scroll portion (5) and a radial direction (Y) of the centrifugal compressor (1).

With the above configuration 4), since the scroll casing (3) satisfies not only Tb/Ta≥1.0 but also α≤50° in the range of the angular position (θ) from 180 degrees to 360 degrees (downstream range RD), compared to the case where only Tb/Ta≥1.0 is satisfied, the interference between the outlet flow (DF) of the diffuser passage and the swirling flow (SF) in the scroll passage can be suppressed in the downstream range (RD) more effectively. As a result, since the blockage of the diffuser passage (40) can be effectively suppressed, it is possible to effectively suppress the reduction in the efficiency of the centrifugal compressor (1) and the reduction in the operating range.

5) In some embodiments, in the scroll casing (3) described in 4), a relationship of α≤70° is satisfied in a range of the angular position (θ) from 60 degrees to 180 degrees (upstream range RU).

With the above configuration 5), the relationship of α≤70° is satisfied in the range of the angular position (θ) from 60 degrees to 180 degrees (upstream range RU). In this case, the interference between the outlet flow (DF) of the diffuser passage and the swirling flow (SF) in the scroll passage can be suppressed in the upstream range (RU). As a result, since the blockage of the diffuser passage (40) can be suppressed, it is possible to suppress the reduction in the efficiency of the centrifugal compressor (1) and the reduction in the operating range.

6) A scroll casing (3) according to at least one embodiment of the present disclosure is a scroll casing (3) for a centrifugal compressor (1), including: a diffuser portion (4) forming a diffuser passage (40) of the centrifugal compressor (1); and a scroll portion (5) forming a scroll passage (50) of the centrifugal compressor (1), in which a relationship of α≤50° is satisfied in a range of an angular position (θ) around a scroll center (O) of the scroll passage from 180 degrees to 360 degrees, where a is an intersection angle between a virtual tangent line (VT) that touches an end position (P2) of an inner peripheral surface (51) of the scroll portion (5) and a radial direction (Y) of the centrifugal compressor (1), the end position (P2) being a position opposite to a start position (P1) which is a connection position with a hub-side passage surface (42) of the diffuser passage (40) on the inner peripheral surface (51) of the scroll portion (5), and the angular position (θ) is defined so that the angle gradually increases from a merging position (P) between a scroll start (501) and a scroll end (502) of the scroll passage (50) of 60 degrees to a downstream side of the scroll passage (50).

If the intersection angle α is too large, the outlet flow (DF) of the diffuser passage and the swirling flow (SF) in the scroll passage interfere with each other, so that the resistance of the fluid passing through the diffuser passage (40) increases, which may induce diffuser stall. When the diffuser stall is induced, the efficiency of the centrifugal compressor (1) is extremely reduced, and surge is induced due to the diffuser stall, resulting in a reduction in the operating range of the centrifugal compressor (1). With the above configuration 6), since the scroll casing (3) satisfies the relationship of α≤50° in the range of the angular position (θ) from 180 degrees to 360 degrees (downstream range RD), the interference between the outlet flow (DF) of the diffuser passage and the swirling flow (SF) in the scroll passage can be suppressed in the downstream range (RD). As a result, since the blockage of the diffuser passage (40) can be suppressed, it is possible to suppress the reduction in the efficiency of the centrifugal compressor (1) and the reduction in the operating range.

7) In some embodiments, in the scroll casing (3) described in 6), a relationship of α≤70° is satisfied in a range of the angular position (θ) from 60 degrees to 180 degrees (upstream range RU).

With the above configuration 7), the relationship of α≤70° is satisfied in the range of the angular position (θ) from 60 degrees to 180 degrees (upstream range RU). In this case, the interference between the outlet flow (DF) of the diffuser passage and the swirling flow (SF) in the scroll passage can be suppressed in the upstream range (RU). As a result, since the blockage of the diffuser passage (40) can be suppressed, it is possible to suppress the reduction in the efficiency of the centrifugal compressor (1) and the reduction in the operating range.

8) In some embodiments, in the scroll casing (3) described in any one of 1) to 7), a relationship of T1<T2 is satisfied, where T1 is a length along an axial direction of the centrifugal compressor (1) between the end position (P2) and a downstream end (43) of a shroud-side passage surface (41) of the diffuser passage (40) at a position where the angular position is θ1, and T2 is a length along the axial direction between the end position (P2) and the downstream end (43) of the shroud-side passage surface (41) at a position where the angular position is θ2 that is larger than θ1.

Normally, the length (T) along the axial direction of the centrifugal compressor (1) between the end position (P2) and the downstream end (43) of the shroud-side passage surface (41) of the diffuser passage (40) is set uniformly in the circumferential direction of the centrifugal compressor (1). In this case, if Tb/Ta and the intersection angle α satisfy the above-described relationship at every angular position (θ), the shape of the scroll passage (50) in the vicinity of the scroll end (502) becomes inappropriate, which may lead to a reduction in the efficiency of the centrifugal compressor (1). With the above configuration 8), since the length T2 of the scroll casing (3) at the angular position θ2 is longer than the length T1 at the angular position θ1, while maintaining the above-described relationship of Tb/Ta and the intersection angle α at every angular position (θ), the scroll passage (50) can be shaped appropriately at every angular position (θ). Thus, it is possible to suppress the reduction in the efficiency of the centrifugal compressor (1).

9) In some embodiments, in the scroll casing (3) described in any one of 1) to 8), a relationship of d1>d2 is satisfied, where d1 is a length along a radial direction (Y) of the centrifugal compressor (1) from an axis (CA) of the centrifugal compressor (1) to a downstream end (43) of a shroud-side passage surface (41) of the diffuser passage (40) at a position where the angular position is θ3, and d2 is a length along the radial direction (Y) from the axis (CA) to the downstream end (43) of the shroud-side passage surface (41) at a position where the angular position is θ4 that is larger than θ3.

Normally, the length (d) along the radial direction (Y) of the centrifugal compressor (1) from the axis (CA) of the centrifugal compressor (1) to the downstream end (43) of the shroud-side passage surface (41) of the diffuser passage (40) is set uniformly in the circumferential direction of the centrifugal compressor (1). In this case, if Tb/Ta and the intersection angle α satisfy the above-described relationship at every angular position (θ), the shape of the scroll passage (50) in the vicinity of the scroll end becomes inappropriate, which may lead to a reduction in the efficiency of the centrifugal compressor (1). With the above configuration 9), since the length d2 of the scroll casing (3) at the angular position θ4 is longer than the length d1 at the angular position θ3, while maintaining the above-described relationship of Tb/Ta and the intersection angle α at every angular position (θ), the scroll passage (50) can be shaped appropriately at every angular position (θ). Thus, it is possible to suppress the reduction in the efficiency of the centrifugal compressor (1).

10) A centrifugal compressor (1) according to at least one embodiment of the present disclosure includes the scroll casing (3) described in any one of 1) to 9).

With the above configuration 10), the scroll casing (3) can suppress the interference between the outlet flow (DF) of the diffuser passage and the swirling flow (SF) in the scroll passage. As a result, since the blockage of the diffuser passage (40) can be suppressed, it is possible to suppress the reduction in the efficiency of the centrifugal compressor (1) and the reduction in the operating range.

REFERENCE SIGNS LIST

1 Centrifugal compressor
2 Impeller
21 Hub
22 Outer surface
23 Impeller blade
24 Tip
3, 03 Scroll casing
31 Fluid introduction port
32 Fluid discharge port
33 Impeller chamber forming surface
34 Stepped surface
4, 04 Diffuser portion
40, 040 Diffuser passage
41, 041 Shroud-side passage surface
42, 042 Hub-side passage surface
43, 043 Downstream end
5, 05 Scroll portion
50, 050 Scroll passage
51, 051 Inner peripheral surface
52 First arc portion
53 Second arc portion
54, 054 Diffuser outlet jaw portion
55 Inner wall surface
6 Shroud portion
60 impeller chamber
61 Shroud surface
7 Intake passage portion
70 Intake passage
71 Inner wall surface
10 Turbocharger
11 Turbine
12 Rotational shaft
13 Turbine rotor
14 Turbine casing
141 Exhaust gas introduction port
142 Exhaust gas discharge port
15 Bearing
16 Bearing casing
A Cross-sectional area
CA Axis
DF Outlet flow
O Scroll center
P Merging position
P1, P01 Start position
P2, P02 End position
P3 Connection position
R0, R1, R2 Curvature radius
RD Downstream range
RU Upstream range
SF Swirling flow
Ta Passage width of diffuser passage
Tb Shortest distance
UD One-direction
VC Virtual arc
VT Virtual tangent line
WA Region
X Axial direction
XF Front side
XR Rear side
Y Radial direction

The invention claimed is:

1. A scroll casing for a centrifugal compressor, comprising:

a diffuser portion forming a diffuser passage of the centrifugal compressor; and a scroll portion forming a scroll passage of the centrifugal compressor, wherein a relationship of Tb/Ta≥1.0 is satisfied in a range of an angular position around a scroll center of the scroll passage from 180 degrees to 360 degrees, where Ta is a passage width of the diffuser passage along an axial direction of the centrifugal compressor, Tb is a shortest distance from a start position which is a connection position with a hub-side passage surface of the diffuser passage on an inner peripheral surface of the scroll portion to a virtual arc that touches an end position which is a position opposite to the start position on the inner peripheral surface, the angular position is defined so that the angle gradually increases from a merging position between a scroll start and a scroll end of the scroll passage of 60 degrees to a downstream side of the scroll passage, wherein a relationship of T1<T2 is satisfied, where T1 is a length along an axial direction of the centrifugal compressor between the end position and a downstream end of a shroud-side passage surface of the diffuser passage at a position where the angular position is first angular θ1, and T2 is a length along the axial direction between the end position and the downstream end of the shroud-side passage surface at a position where the angular position is second angular θ2 that is larger than the first angular θ1.

2. The scroll casing according to claim 1;

wherein a relationship of Tb/Ta≥0.5 is satisfied in a range of the angular position from 60 degrees to 180 degrees.

3. The scroll casing according to claim 1, wherein a relationship of Tb/Ta≥1.75 is satisfied in a range of the angular position from 180 degrees to 360 degrees.

4. The scroll casing according to claim 1, wherein a relationship of α≤50° is satisfied in a range of the angular position from 180 degrees to 360 degrees, where α is an intersection angle between a virtual tangent line that touches the end position of the inner peripheral surface of the scroll portion and a radial direction of the centrifugal compressor.

5. The scroll casing according to claim 4, wherein a relationship of α≤70° is satisfied in a range of the angular position from 60 degrees to 180 degrees.

6. A centrifugal compressor, comprising a scroll casing according to claim 1.

7. A scroll casing for a centrifugal compressor, comprising:

a diffuser portion forming a diffuser passage of the centrifugal compressor; and a scroll portion forming a scroll passage of the centrifugal compressor, wherein a relationship of $Tb/Ta \geq 1.0$ is satisfied in a range of an angular position around a scroll center of the scroll passage from 180 degrees to 360 degrees, where Ta is a passage width of the diffuser passage along an axial direction of the centrifugal compressor, Tb is a shortest distance from a start position which is a connection position with a hub-side passage surface of the diffuser passage on an inner peripheral surface of the scroll portion to a virtual arc that touches an end position which is a position opposite to the start position on the inner peripheral surface, the angular position is defined so that the angle gradually increases from a merging position between a scroll start and a scroll end of the scroll passage of 60 degrees to a downstream side of the scroll passage, wherein a relationship of d1>d2 is satisfied, where d1 is a length along a radial direction of the centrifugal compressor from an axis of the centrifugal compressor to a downstream end of a shroud-side passage surface of the diffuser passage at a position where the angular position is third angular θ3, and d2 is a length along the radial direction from the axis to the downstream end of the shroud-side passage surface at a position where the angular position is fourth angular θ4 that is larger than the third angular θ3.

8. A centrifugal compressor, comprising a scroll casing according to claim 7.

* * * * *